(12) United States Patent
Yang et al.

(10) Patent No.: US 12,494,547 B2
(45) Date of Patent: Dec. 9, 2025

(54) APPARATUS FOR MANUFACTURE OF ELECTRODE ASSEMBLY AND ELECTRODE ASSEMBLY MANUFACTURED BY THE SAME

(71) Applicant: SK ON CO., LTD., Seoul (KR)

(72) Inventors: Ji Won Yang, Daejeon (KR); Young Rae Oh, Daejeon (KR); Jae Young Jung, Daejeon (KR)

(73) Assignee: SK ON CO., LTD., Seoul (KR)

( * ) Notice: Subject to any disclaimer, the term of this patent is extended or adjusted under 35 U.S.C. 154(b) by 389 days.

(21) Appl. No.: 17/893,090

(22) Filed: Aug. 22, 2022

(65) Prior Publication Data

US 2023/0207962 A1    Jun. 29, 2023

(30) Foreign Application Priority Data

Dec. 29, 2021 (KR) .................. 10-2021-0191244

(51) Int. Cl.
*H01M 50/406* (2021.01)
*H01M 10/04* (2006.01)
*H01M 50/46* (2021.01)

(52) U.S. Cl.
CPC ..... *H01M 50/406* (2021.01); *H01M 10/0459* (2013.01); *H01M 50/46* (2021.01)

(58) Field of Classification Search
CPC . H01M 10/0459; H01M 50/406; H01M 50/46
See application file for complete search history.

(56) References Cited

U.S. PATENT DOCUMENTS

2010/0132308 A1* 6/2010 Kadowaki .............. B65H 39/14
414/789.5
2014/0237808 A1* 8/2014 Nakakuki ......... H01M 10/0459
29/730

(Continued)

FOREIGN PATENT DOCUMENTS

CN        103682460 A    3/2014
EP          2149927 A1    2/2010
(Continued)

OTHER PUBLICATIONS

Extended European Search Report for European Patent Application No. 22191519.2, mailed May 25, 2023 (7 pages).

*Primary Examiner* — Matthew T Martin
(74) *Attorney, Agent, or Firm* — Perkins Coie LLP

(57) ABSTRACT

An apparatus for manufacturing an electrode assembly includes a stacking plate including a first stacking region in which a cathode plate, an anode plate and a separator are stacked; a first actuator connected to the stacking plate and configured to move the stacking plate; an electrode assembly release unit configured to, in a state in which a separator is present on an uppermost portion of a preliminary electrode assembly formed by stacking the cathode plate, the anode plate, and the separator, provide tension to the separator by pulling the preliminary electrode assembly to the outside of the stacking plate; a separator fixing unit configured to press the separator in a state in which only the separator remains on the stacking plate; and a separator cutting unit configured to cut the separator on the stacking plate after the separator fixing unit presses the separator.

17 Claims, 11 Drawing Sheets

(56) References Cited

U.S. PATENT DOCUMENTS

2014/0302365 A1     10/2014   Park et al.
2015/0033547 A1      2/2015   Yang et al.

FOREIGN PATENT DOCUMENTS

| | | |
|---|---|---|
| EP | 2770569 A2 | 8/2014 |
| JP | 2008-073802 A | 4/2008 |
| JP | 6205987 B2 | 10/2017 |
| KR | 10-2014-0121994 A | 10/2014 |
| KR | 10-1637659 B1 | 7/2016 |
| KR | 10-1956758 B1 | 3/2019 |
| KR | 10-2020-0031348 A | 3/2020 |
| KR | 10-2320868 B1 | 11/2021 |

* cited by examiner

APPARATUS FOR MANUFACTURE OF ELECTRODE ASSEMBLY AND ELECTRODE ASSEMBLY MANUFACTURED BY THE SAME

CROSS-REFERENCE TO RELATED APPLICATION(S)

This application claims benefit of priority to Korean Patent Application No. 10-2021-0191244 filed on Dec. 29, 2021 in the Korean Intellectual Property Office, the disclosure of which is incorporated herein by reference in its entirety.

TECHNICAL FIELD

The present disclosure relates to an apparatus for manufacturing an electrode assembly and an electrode assembly manufactured by the same.

BACKGROUND

A secondary battery has been widely used in small electronic devices such as a mobile phone and a laptop and also in medium and large-sized mechanical devices such as an electric vehicle (EV), and may have an advantage of being recharged and reused.

Such a secondary battery may be formed by accommodating an electrode assembly including an anode plate, a cathode plate, and a separator in a case, injecting an electrolyte into the case and sealing the case.

To manufacture the electrode assembly, a predetermined number of positive and cathode plates may be alternately stacked on a separator while continuously supplying the separator. In the electrode assembly manufactured as above, a separator may have a zigzag folded form between the positive and cathode plates, whereby the separator may be present between the positive and cathode plates.

After stacking a predetermined number of anode plates and a predetermined number of cathode plates on the separator, surfaces of the anode plate, the cathode plate and the separator stack may be rolled into a separator, and by cutting the separator, an electrode assembly may be manufactured.

SUMMARY

An aspect of the present disclosure is to improve quality of an electrode assembly and to improve efficiency of a process of manufacturing the electrode assembly.

An aspect of the present disclosure is to improve quality of a cut-out surface of a separator.

According to an aspect of the present disclosure, an apparatus for manufacturing an electrode assembly includes a stacking plate including a first stacking region in which a cathode plate, an anode plate and a separator are stacked; a first actuator connected to the stacking plate and configured to move the stacking plate; an electrode assembly release unit configured to, in a state in which a separator is present on an uppermost portion of a preliminary electrode assembly formed by stacking the cathode plate, the anode plate, and the separator, provide tension to the separator by pulling the preliminary electrode assembly to the outside of the stacking plate; a separator fixing unit configured to press the separator in a state in which only the separator remains on the stacking plate; and a separator cutting unit configured to cut the separator on the stacking plate after the separator fixing unit presses the separator.

The stacking plate may include a hollow portion; and a first escape groove present outside the first stacking region, wherein the first actuator is configured to move the stacking plate down by a distance equal to a thickness of the separator whenever the separator is stacked in the first stacking region, to move the stacking plate down by a distance equal to a thickness of the cathode plate whenever the cathode plate is stacked in the first stacking region, and to move the stacking plate down by a distance equal to a thickness of the anode plate whenever the anode plate is stacked in the first stacking region, and wherein the electrode assembly release unit may be configured to grip the preliminary electrode assembly and to move the preliminary electrode to the outside of the hollow portion, such that only the separator opposes the first escape groove.

The first actuator may be configured to, in a state in which only the separator opposes the first escape groove, move the stacking plate up and allow the stacking plate to return to an initial position, and the separator cutting unit may be configured to, in a state in which the separator opposes the first escape groove, cut the separator to be inserted into the first escape groove.

The apparatus may further include a moving plate having a second stacking region surrounded by the stacking plate, where the cathode plate, the anode plate and the separator are stacked in the second stacking region; and a second actuator connected to the moving plate and configured to move the moving plate.

The moving plate may include a protrusion region disposed to oppose the separator cutting unit with the separator interposed therebetween and configured to push the separator up in a direction of the separator cutting unit.

The stacking plate may include a hollow portion into which the moving plate is inserted, and at least a portion of the moving plate may be present in the hollow portion.

The first actuator may be configured to move the stacking plate down by a distance equal to a thickness of the separator whenever the separator is stacked in the first stacking region, to move the stacking plate down by a distance equal to a thickness of the cathode plate whenever the cathode plate is stacked in the first stacking region, and to move the stacking plate down by a distance equal to a thickness of the anode plate whenever the anode plate is stacked in the first stacking region, and the second actuator may be configured to move the moving plate down, such that the second stacking region may be disposed on the same level as a level of the first stacking region.

The second actuator may be configured to move the moving plate down to allow the moving plate to be separated from the hollow portion, such that the second stacking region may be released from the preliminary electrode assembly, the electrode assembly release unit may be configured to enter the hollow portion, to grip the preliminary electrode assembly and to move the preliminary electrode assembly to the outside of the hollow portion, the first actuator to move configured to, in a state in which only the separator opposes the first stacking region, move the stacking plate up and allow the stacking plate to return to an initial position, and the second actuator is configured to move the moving plate up such that the second stacking region is disposed on the same level as a level of the first stacking region.

The moving plate may include a second escape groove present outside the second stacking region, and the electrode assembly release unit may be configured to move the preliminary electrode assembly to the outside of the hollow portion, such that only the separator opposes the second escape groove.

The separator fixing unit may be provided to oppose the first stacking region with the separator interposed therebetween, and to press the separator such that the separator may be in close contact with the first stacking region.

The separator cutting unit may include a cutting member configured to, in a state in which the separator fixing unit presses the separator, move down in a direction of the separator and to cut the separator, and the cutting member may be configured to cut the separator in a state in which the separator may oppose the second escape groove, and to be inserted into the second escape groove.

The protrusion region may be formed as a region adjacent to the second escape groove in the moving plate protrudes in a direction of the separator.

An end of the protrusion region may be in contact with the separator, and a difference in heights between the end and the first stacking region is 1 mm or more and 5 mm or less.

The apparatus may further include a separator supply unit configured to supply the separator to the first stacking region; a cathode plate providing unit configured to allow the cathode plate to be seated on the separator; an anode plate providing unit configured to allow the anode plate to be seated on the separator; and a rotation actuator connected to the stacking plate and configured to move the stacking plate rotationally between the cathode plate providing unit and the anode plate providing unit, The stacking plate may include at least one clamping member configured to fix the cathode plate, the anode plate, and the separator in the first stacking region.

The apparatus may further include a separator supply unit configured to supply the separator to the first stacking region and the second stacking region; a cathode plate providing unit configured to allow the cathode plate to be seated on the separator; an anode plate providing unit configured to allow the anode plate to be seated on the separator; and a rotation actuator connected to the stacking plate and the moving plate, and configured to move the stacking plate and the moving plate rotationally between the cathode plate providing unit and the anode plate providing unit.

At least one of the stacking plate and the moving plate may include at least one clamping member configured to fix the cathode plate, the anode plate and the separator to at least one of the first stacking region and the second stacking region.

The separator fixing unit may include a fixing member in contact with the separator; and a close-contact actuator connected to the fixing member and configured to allow the fixing member to be in close contact with the separator after the protrusion region is disposed on a level higher than a level of the first stacking region.

The separator cutting unit may further include a cutting housing to which the cutting member is fixed; a guide bush configured to extend by penetrating the cutting housing; a driving shaft connected to the guide bush and configured to extend in a direction of the separator; a pad provided on the driving shaft and opposing the protrusion region with the separator interposed therebetween; and a cutting actuator connected to the cutting housing and configured to move the cutting housing.

The cutting actuator may be configured to move the cutting housing in a direction of the separator after the separator is pressed by the protrusion region and the pad.

The electrode assembly release unit may include a release gripper configured to grip the preliminary electrode assembly; and a release actuator connected to the release gripper and configured to move the release gripper.

According to an aspect of the present disclosure, an electrode assembly formed by cutting a separator by an apparatus for manufacturing an electrode assembly including a stacking plate including a first stacking region in which a cathode plate, an anode plate and a separator are stacked; a first actuator connected to the stacking plate and configured to move the stacking plate; an electrode assembly release unit configured to, in a state in which a separator is present on an uppermost portion of a preliminary electrode assembly formed by stacking the cathode plate, the anode plate, and the separator, provide tension to the separator by pulling the preliminary electrode assembly to the outside of the stacking plate; a separator fixing unit configured to press the separator in a state in which only the separator remains on the stacking plate; and a separator cutting unit configured to cut the separator on the stacking plate after the separator fixing unit presses the separator is provided.

A difference between a maximum height and a minimum height of uneven regions of the cut-out surface of the separator may be 0 mm or more and 2 mm or less.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
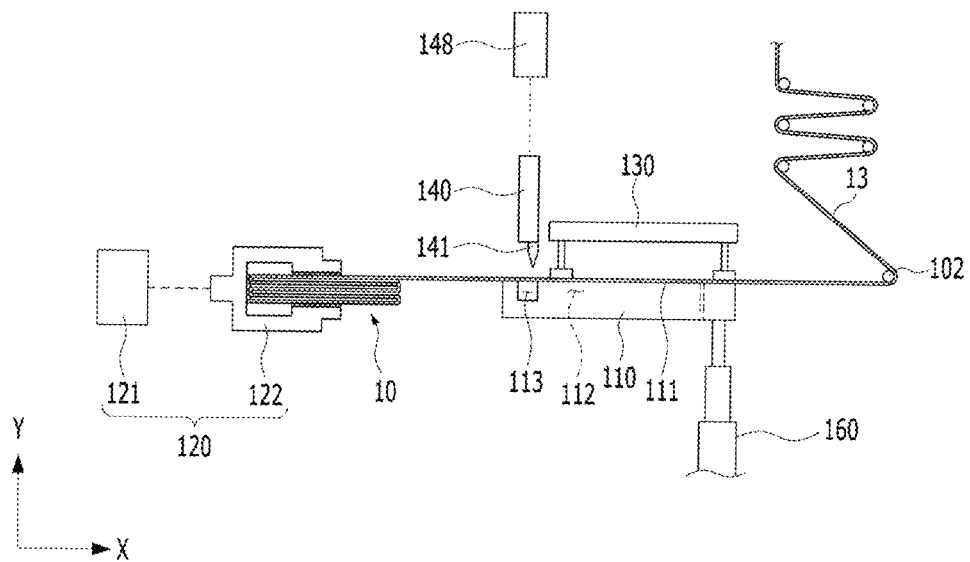
FIG. 1 is a diagram schematically illustrating a portion of an apparatus for manufacturing an electrode assembly according to an example embodiment of the present disclosure.

Hereinafter, embodiments of the present disclosure will be described as follows with reference to the attached drawings.

To help in an understanding of the description of an example embodiment of the present disclosure, elements described with the same reference numerals in the accompanying drawings are the same elements, and related elements among the elements which may perform the same operation in each embodiment are denoted by the same reference numeral or the extended number.

Also, to clarify the gist of the present disclosure, a description of elements and techniques well known in the prior art will be omitted, and the present disclosure will be described in detail with reference to the accompanying drawings.

The spirit of the present disclosure is not limited to the example embodiments, and specific components may be suggested in other forms with the addition, change, or deletion by those skilled in the art, but this also is included in the scope of the same spirit of the present disclosure.

Hereinafter, the X axis in the accompanying drawings is a length direction of a separator, the Y axis is a thickness direction of the separator, and the Z axis is a width direction of the separator.

FIG. 1 is a diagram schematically illustrating a portion of an apparatus for manufacturing an electrode assembly according to an example embodiment.

As illustrated in FIG. 1, the apparatus for manufacturing an electrode assembly according to an example embodiment may include a stacking plate 110 having a first stacking region 111. In the first stacking region 111, an anode plate (not illustrated), a cathode plate (not illustrated), and a separator 13 may be stacked.

The separator 13 may be continuously supplied to the first stacking region 111 while tension is controlled by a tension roller 102. The stacking plate 110 may be disposed closer to the Y axis than the tension roller 102.

The anode plate (not illustrated) and the cathode plate (not illustrated) may be alternately stacked on the separator 13 continuously supplied to the first stacking region 111. When the anode plate (not illustrated) and the cathode plate (not illustrated) are stacked in a predetermined amount, the preliminary electrode assembly 10 may remain in the first stacking region 111. The preliminary electrode assembly 10 may be a stack of the anode plate (not illustrated), the cathode plate (not illustrated), and the separator 13 before the separator 13 is cut, and when the separator 13 is cut in the preliminary electrode assembly 10, the preliminary electrode assembly 10 may be manufactured as an electrode assembly.

The first actuator 160 may be connected to the stacking plate 110, and the first actuator 160 may move the stacking plate 110 in the +Y direction and the −Y direction.

When a predetermined number of the anode plates (not illustrated) and the cathode plates (not illustrated) are stacked on the separator 13 supplied to the first stacking region 111, the preliminary electrode assembly 10 present in the first stacking region 111 may move to the outside of the stacking plate 110 by the electrode assembly release unit 120.

The electrode assembly release unit 120 may include a release gripper 122 entering the first stacking region 111 and gripping preliminary electrode assembly 10, and a release actuator 121 connected to the and the release gripper 122 and moving the release gripper 122 in the +X direction and the −X direction.

In an example embodiment, the release actuator 121 may include a robotic arm, a cylinder using hydraulic or pneumatic pressure, a ball screw connected to a rotation shaft of a motor, and a transfer nut converting rotational movement of the ball screw into a linear movement, but an example embodiment thereof is not limited thereto, and this configuration may be appropriately selected and applied in consideration of the manufacturing environment.

The release gripper 122 may move in the +X direction by the release actuator 121, and may move in the −X direction by the release actuator 121 while gripping the preliminary electrode assembly 10, such that the preliminary electrode assembly 10 may move to the outside of the stacking plate 110. Thereafter, only the separator 13 may remain on the stacking plate 110. In this case, the separator 13 may extend to the outside of the stacking plate 110, and a predetermined level of tension may be provided to the separator 13 by the release gripper 122. In this case, the tension roller 102 may relatively weaken strength of tension provided to the separator 13. Accordingly, the release gripper 122 may extend the separator 13 to the outside of the stacking plate 110 more easily.

When the preliminary electrode assembly 10 is drawn out of the stacking plate 110, and tension is provided to the separator 13, the separator fixing unit 130 may move in the −Y direction and may press the separator 13. A separate driving mechanism (not illustrated) may be connected to the separator fixing unit 130 and may move the separator fixing unit 130 in the +Y direction and the −Y direction. The driving mechanism (not illustrated) may include a robotic arm, a cylinder using hydraulic or pneumatic pressure, a ball screw connected to a rotation shaft of a motor, and a transfer nut converting rotational movement of the ball screw into linear movement.

The separator fixing unit 130 may press the separator 13 with pressure such that scratches or dents do not remain on the surface of the separator 13. The separator fixing unit 130 may allow the separator 13 to be in close contact with the stacking plate 110, may fix the separator 13 to not meander, and may provide tension to the separator 13 together with the release gripper 122. In a state in which tension is provided to the separator 13 by the release gripper 122 and the separator fixing unit 130 as above, the operation of additionally supplying the separator 13 to the stacking plate 110 may be stopped.

After the separator fixing unit 130 presses the separator 13, the separator cutting unit 140 may cut the separator 13. The separator cutting unit 140 may include a cutting member 141 for cutting the separator 13 and a cutting actuator 148 for moving the cutting member 141 in the +Y direction and the −Y direction. In an example embodiment, the cutting member 141 may include a circular saw blade which may be rotatably provided.

In an example embodiment, the stacking plate 110 may include a first escape groove 113 present outside the first stacking region 111. The first escape groove 113 may be a groove formed in the −Y direction on an outer periphery of the stacking plate 110.

The release gripper 122 may grip the preliminary electrode assembly 10 and may pull the preliminary electrode assembly 10 to the outside of the stacking plate 110 such that only the separator 13 may oppose the first escape groove 113. In a state in which the separator 13 opposes the first escape groove 113 and tension is applied to the separator 13, the cutting member 141 may move down in the −Y direction and may cut the separator 13.

In this case, the outer periphery of the preliminary electrode assembly 10 may be wrapped around by the present from an end of the preliminary electrode assembly 10 in the +X direction to the point at which cutting is performed by the cutting member 141. Accordingly, the release gripper 122 may move the preliminary electrode assembly 10 in the −X direction after the separator 13 is cut. For example, assuming that the cutting member 141 is a zero (0) point, the release gripper 122 may move the preliminary electrode assembly 10 in the −X direction such that a length of the separator 13 remaining in an −X region, a length of the separator 13 between the preliminary electrode assembly 10 and the cutting member 141, may become sufficient to surround the preliminary electrode assembly 10 once.

The length may be a distance in which the separator 13 may sufficiently remain such that the preliminary electrode assembly 10 may be wrapped around by the separator 13 cut by the cutting member 141 once.

The cutting member 141 may be inserted into the first escape groove 113 after the separator 13 is cut. When the cutting member 141 which has completed the cutting operation is inserted into the first escape groove 113, impact applied to the cutting member 141 may be reduced. Accordingly, damage and wear of the cutting member 141 may be reduced, and lifespan of the manufacturing apparatus may be extended.

Using the release gripper 122 and the separator fixing unit 130, sufficient tension may be provided to the separator 13, and a state in which the separator 13 is placed taut in the X-axis direction may be obtained. Strength of the tension provided to the separator 13 may be determined by adjusting force of the release gripper 122 pulling the separator 13 in the −X direction and force of the separator fixing unit 130 pressing the separator 13. Strength of the tension provided to the separator 13 may be determined to be an appropriate level in consideration of a material of the separator 13, and the release gripper 122 and the separator fixing unit 130 may be used to implement the determined tension strength.

Figure 2:
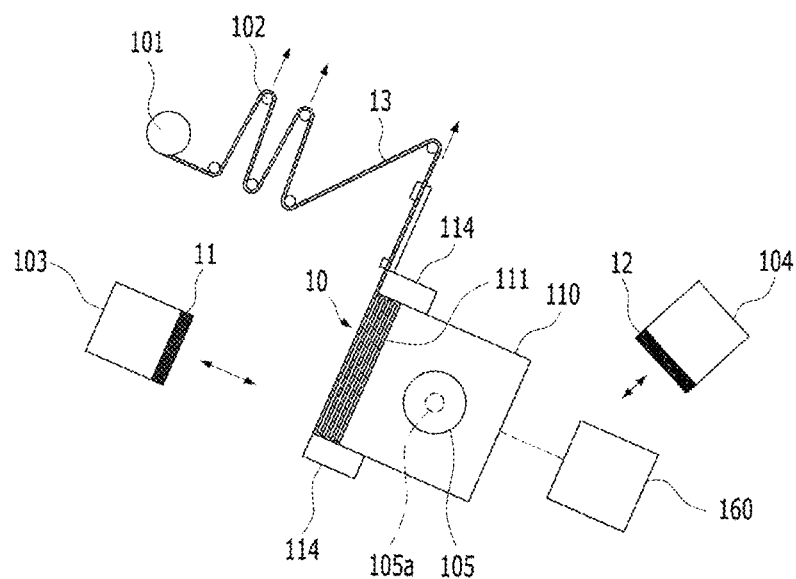
FIG. 2 is a diagram schematically illustrating a process in which an apparatus for manufacturing an electrode assembly stacks a preliminary electrode assembly according to an example embodiment of the present disclosure.

FIG. 2 is a diagram schematically illustrating a process in which an apparatus for manufacturing an electrode assembly stacks a preliminary electrode assembly 10 according to an example embodiment.

As illustrated in FIG. 2, the apparatus for manufacturing an electrode assembly according to an example embodiment may include a separator supply unit 101 providing a separator 13 to the first stacking region 111 of the stacking plate 110. The separator supply unit 101 may continuously supply the separator 13 by unwinding the separator 13.

A tension roller 102 may be provided between the separator supply unit 101 and the stacking plate 110, and the separator 13 may be in contact with an outer periphery of the tension roller 102 and may be provided to the stacking plate 110 along the tension roller 102. The tension roller 102 may be connected to a tension roller actuator (not illustrated) and may move in the +X direction and the −X direction.

In an example embodiment, the tension roller actuator (not illustrated) may be a cylinder member (not illustrated) in which a piston rod is extended or reduced in the +X direction and the −X direction. The tension roller 102 may be connected to the piston rod of the tension roller actuator (not illustrated) and may move in the +X direction and the −X direction.

In another example embodiment, the tension roller actuator (not illustrated) may be configured by a combination of a rotating motor (not illustrated) having a rotating shaft connected to a speed reducer, a ball screw (not illustrated) connected to the rotating shaft and a transfer nut (not illustrated). A transfer nut (not illustrated) of the tension roller actuator (not illustrated) may be connected to the tension roller 102, and the tension roller 102 may move back and forth in the +X direction and the −X direction. This reciprocating movement may be performed by a predetermined distance in the X-axis direction, or may be performed periodically.

The tension roller actuator (not illustrated) may adjust tension provided to the separator 13 by moving the tension roller 102. By providing an appropriate tension to the separator 13, wrinkles may be prevented from being formed in the separator 13, and an anode plate (not illustrated) and a cathode plate (not illustrated) may be easily stacked on the separator 13.

A rotation actuator 105 may be connected to the stacking plate 110, and the rotation actuator 105 may rotationally move the stacking plate 110. In an example embodiment, the rotation actuator 105 may be a motor including a rotation shaft 105a. The rotation shaft 105a of the motor may be connected to the stacking plate 110 via a speed reducer.

The cathode plate providing unit 103 may be disposed on one side of the stacking plate 110, and the anode plate providing unit 104 may be disposed on the other side of the stacking plate 110. The rotation actuator 105 may move the stacking plate 110 such that the first stacking region 111 of the stacking plate 110 opposes the cathode plate providing unit 103.

A single cathode plate 11 provided by the cathode plate providing unit 103 may be stacked on the separator 13 in a state in which the separator 13 is present in the first stacking region 111. The cathode plate providing unit 103 may be provided to move in a direction toward the first stacking region 111 and to move in a direction of being away from the first stacking region 111. The cathode plate providing unit 103 may supply a single cathode plate 11 to the first stacking region 111.

When the cathode plate 11 is seated on the separator 13 already present in the first stacking region 111, at least one clamping member 114 connected to the stacking plate 110 may press at least a partial region of the separator 13 and the cathode plate 11 in the direction of the stacking plate 110. Accordingly, the separator 13 and the cathode plate 11 may be prevented from being separated from the stacking plate 110.

When the seating of the cathode plate 11 in the first stacking region 111 is completed, the rotation actuator 105 may rotate the stacking plate 110 such that the first stacking region 111 may oppose the anode plate providing unit 104. In this case, since the separator 13 is continuously supplied to the stacking plate 110, the operation of rotating the stacking plate 110 in the direction of the anode plate providing unit 104 may immediately pull the separator 13 to cover the surface of the cathode plate 11 stacked on the separator 13. Here, since the clamping member 114 presses at least a partial region of the separator 13 in the direction of the stacking plate 110, another separator 13 may easily cover the upper portion of the cathode plate 11 while the rotation actuator 105 rotates the stacking plate 110.

In a state in which the rotation actuator 105 completes rotational movement of the stacking plate 110, and the first stacking region 111 opposes the anode plate providing unit 104, the anode plate 12 present in the anode plate providing unit 104 may oppose the separator 13. In this state, the anode plate providing unit 104 may moves in a direction toward the first stacking region 111 and may stack the anode plate 12 on the separator 13, and the anode plate providing unit 104 may retreat in a direction of being away from the first stacking region 111. In this case, the clamping member 114 may press at least a partial region of the separator 13, the cathode plate 11 and the anode plate 12 in the direction of the stacking plate 110 such that the separator 13, the cathode plate 11 and the anode plate 12 are not separated from the first stacking region 111.

The rotation actuator 105 may rotate the stacking plate 110 again such that the first stacking region 111 opposes the cathode plate providing unit 103. Accordingly, the surface of the anode plate 12 may be covered by the separator 13, and the separator 13 may oppose the cathode plate 11. In this state, the cathode plate providing unit 103 may move in a direction toward the first stacking region 111 and may re-stack the cathode plate 11 on the separator 13. By repeating this process, the preliminary electrode assembly 10 may be formed in the first stacking region 111.

In an example embodiment, the first actuator 160 may be connected to the stacking plate 110. The first actuator 160 may be provided to move the stacking plate up 110 in a thickness direction of the preliminary electrode assembly 10.

In a state in which the cathode plate 11, the anode plate 12, and the separator 13 are not present in the first stacking region 111, the separator 13 may be placed first in the first stacking region 111. Also, in a state in which the separator 13 opposes the cathode plate providing unit 103, the movement of the stacking plate 110 may be stopped. Accordingly, the cathode plate providing unit 103 may move in the direction of the first stacking region 111 and may stack the cathode plate 11 on the separator 13. Alternatively, the anode plate 12 may be stacked first on the separator 13, and to stack the anode plate 12 first, the stacking plate 110 may be rotated such that the first stacking region 111 of the stacking plate 110 opposes the anode plate providing unit 104 first.

When the cathode plate 11 is first stacked on the separator 13 in the first stacking region 111, by rotating the stacking plate 110 in the direction of the anode plate providing unit 104, the separator 13 may cover the cathode plate 11, and the anode plate 12 may be stacked on the separator 13.

In this case, since the cathode plate 11 is stacked on the separator 13 in the first stacking region 111, a thickness of the preliminary electrode assembly 10 present in the first stacking region 111 may be a sum of a thickness of the separator 13 and a thickness of a single cathode plate 11.

When the anode plate 12 is stacked on the separator 13 and the stacking plate 110 rotates in the direction of the cathode plate providing unit 103, the separator 13 may be stacked again on the anode plate 12, such that a thickness of the preliminary electrode assembly 10 opposing the cathode plate providing unit 103 may be a sum of a thickness of three separators 13, a thickness of a single cathode plate 11, and a thickness of a single anode plate 12. Accordingly, the distance between the cathode plate providing unit 103 and the preliminary electrode assembly 10 may reduce as the number of stacking of the cathode plate 11 and the anode plate 12 increases, which may be equally applied to the anode plate providing unit 104.

To prevent a change in the distance between the separator 13 present in an uppermost portion of the preliminary electrode assembly 10 and the cathode plate providing unit 103 or the positive electrode providing unit 104, the first actuator 160 may move down the stacking plate 110 while the separator 13, the anode plate 12, and the cathode plate 11 are stacked in the stacking region 111. The downward movement of the stacking plate 110 may indicate that the first stacking region 111 moves in a direction of being away from the cathode plate providing unit 103 or the anode plate providing unit 104 in the thickness direction of the separator 13, and upward movement may indicate that the first stacking region 111 moves in a direction toward the cathode plate providing unit 103 or the anode plate providing unit 104 in the thickness direction of the separator 13.

As above, when the stacking plate 110 moves down by the thickness of the anode plate 12, the cathode plate 11, and the separator 13 while the anode plate 12, the cathode plate 11, and the separator 13 are stacked on the first stacking region 111, a distance between the surface of the separator 13 and the anode plate providing unit 104 or the cathode plate providing unit 103 may be maintained to be constant, which may allow the cathode plate 11 and the anode plate 12 to be stacked in the same position every time, and may thus contribute to improving reliability of the manufacturing apparatus.

In an example embodiment, the first actuator 160 may move down the stacking plate 110 by a thickness of a single separator 13 whenever the separator 13 is stacked on the first stacking region 111. Also, the first actuator 160 may move down the stacking plate 110 by the thickness of a single cathode plate 11 whenever the cathode plate 11 is stacked in the first stacking region 111, and the first actuator 160 may move down the stacking plate 110 by a thickness of a single anode plate 12 whenever the anode plate 12 is stacked.

The first actuator 160 may, when the preliminary electrode assembly 10 is separated from the first stacking region 111, move the stacking plate up 110 and may return the stacking plate 110 to an initial position. The initial position of the stacking plate 110 may be a position of the stacking plate 110 in a state in which a single separator 13 is disposed in the first stacking region 111.

In an example embodiment, the first actuator 160 may include a cylinder using hydraulic or pneumatic pressure, a ball screw connected to a rotation shaft of a motor, and a transfer nut for converting rotational movement of the ball screw into a linear movement. However, an example embodiment thereof is not limited thereto, and this configuration may be appropriately selected and applied according to the environment in which the electrode assembly is manufactured.

Figure 3:
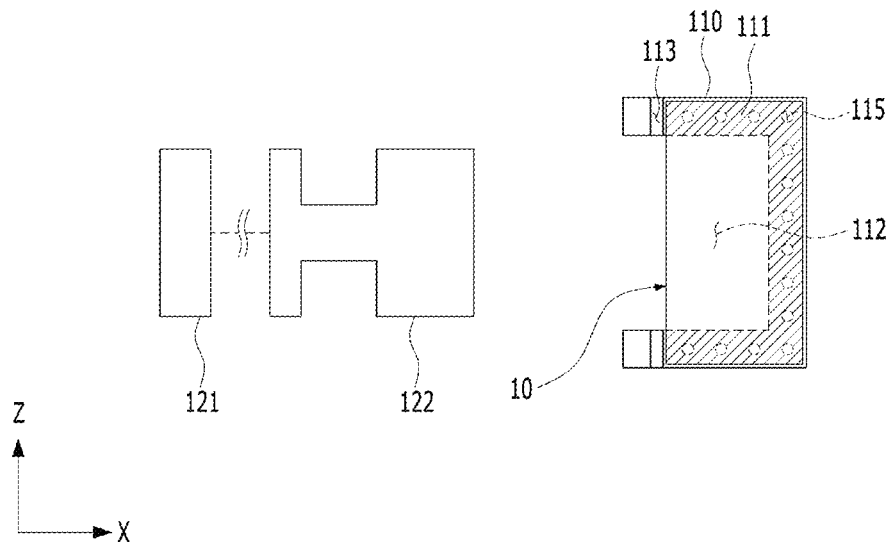
FIG. 3 is a plan diagram schematically illustrating a portion of an apparatus for manufacturing an electrode assembly according to an example embodiment of the present disclosure.

FIG. 3 is a plan diagram schematically illustrating a portion of an apparatus for manufacturing an electrode assembly according to an example embodiment.

As illustrated in FIG. 3, in an example embodiment, the stacking plate 110 may include a hollow portion 112. The hollow portion 112 may be formed by recessing at least a partial region of one side of the stacking plate 110 in the +X direction. The first stacking region 111 may be formed on the surface of the stacking plate 110.

The stacking plate 110 may include a first escape groove 113 concavely formed in a −Y (Y in FIG. 1) direction on the surface on which the first stacking region 111 is formed. The first escape groove 113 may be present outside the first stacking region 111 on the X-Z plane. At least a partial region of the preliminary electrode assembly 10 may be in contact with the first stacking region 111, and the preliminary electrode assembly 10 may be supported by the first stacking region 111. In the preliminary electrode assembly 10, a region not in contact with the first stacking region 111 may oppose the hollow portion 112.

In an example embodiment, the stacking plate 110 may include at least one suction hole 115 for stacking. The stacking suction hole 115 may be provided to adsorb the preliminary electrode assembly 10 when a predetermined degree of vacuum is reached. A pipe (not illustrated) connected to a vacuum pump (not illustrated) may be connected to the stacking suction hole 115. Accordingly, the preliminary electrode assembly 10 may be prevented from being separated from the stacking plate 110, and the preliminary electrode assembly 10 may be prevented from meandering in the first stacking region 111.

Meanwhile, the release gripper 122 may be present outside the hollow portion 112 while the separator 13 (in FIG. 2), the cathode plate 11 (in FIG. 2) and the anode plate 12 (in FIG. 2) are stacked in the first stacking region 111. While the separator 13 (in FIG. 2), the cathode plate 11 (in FIG. 2) and the anode plate 12 (in FIG. 2) are stacked in the first stacking region 111, the stacking suction hole 115 may perform an operation of absorbing the preliminary electrode assembly 10.

Figure 4:
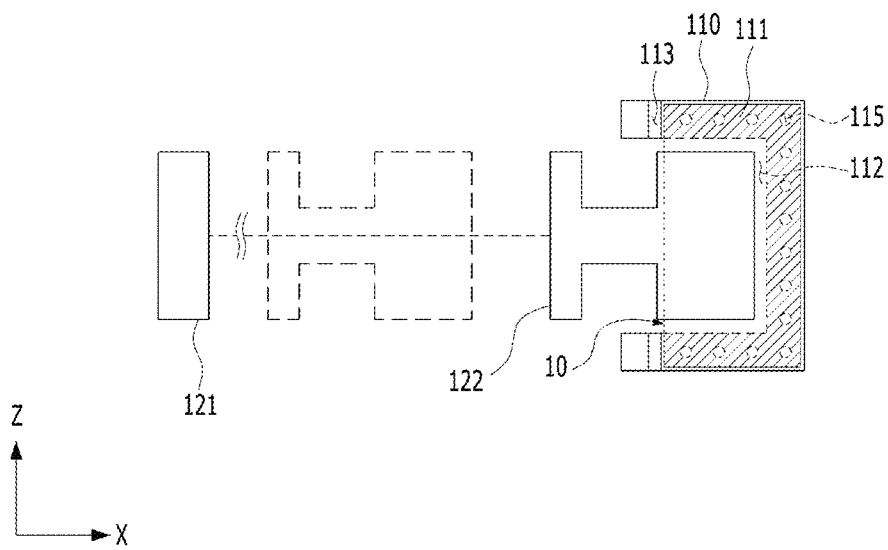
FIG. 4 is a diagram illustrating an operation state of a release gripper according to an example embodiment of the present disclosure.

FIG. 4 is a diagram illustrating an operation state of a release gripper 122 according to an example embodiment.

As illustrated in FIG. 4, the stacking of the separator 13 (in FIG. 2), the cathode plate 11 (in FIG. 2) and the anode plate 12 (in FIG. 2) in the first stacking region 111 is completed, and the stacking plate 110 is in a stopped state, the release actuator 121 may move the release gripper 122 in the +X direction.

The release gripper 122 may enter the hollow portion 112 of the stacking plate 110, may be in contact with the surface of the preliminary electrode assembly 10 in the hollow portion 112 and may grip the preliminary electrode assembly 10. When the release gripper 122 completes gripping the preliminary electrode assembly 10, the stacking suction hole 115 may stop the operation of adsorbing the preliminary electrode assembly 10.

The release actuator 121 may move the release gripper 122 in the −X direction when the release gripper 122 completes the gripping of the preliminary electrode assembly 10 such that the release gripper 122 may move to the outside of the stacking plate 110. Accordingly, as illustrated in FIG. 1, the separator 13 (in FIG. 1) may also extend to the outside of the stacking plate 110, and the separator 13 (in FIG. 1) may oppose the first escape groove 113.

While the release gripper 122 moves in the −X direction while gripping the preliminary electrode assembly 10, the first actuator 160 (in FIG. 1) may move the stacking plate up 110 by a thickness of the preliminary electrode assembly 10 in the Y-axis direction. The first actuator 160 (in FIG. 1) may return the stacking plate 110 to the above-described initial position by moving the stacking plate 110 in the +Y direction. Accordingly, the stacking plate 110 may move up in the +Y (Y in FIG. 1) direction by the distance by which the stacking plate 110 moved down in the −Y (Y in FIG. 1) direction while the separator 13, the cathode plate 11 (in FIG. 2), and the anode plate 12 (in FIG. 2) are stacked on the first stacking region 111. Accordingly, the separator 13 (in FIG. 1) opposing the first stacking region 111 and the separator 13 (in FIG. 1) present on the uppermost portion of the preliminary electrode assembly 10 gripped by the release gripper 122 may be aligned in the X axis (X in FIG. 1) direction.

While the release gripper 122 moves in the −X direction while gripping the preliminary electrode assembly 10, the separator fixing unit 130 (in FIG. 1) may also move down in the direction of the separator 13. Accordingly, when the release gripper 122 completes the movement in the −X direction, as illustrated in FIG. 1, the operation of the stacking plate 110 returning to the initial position may be completed, and the separator fixing unit 130 (in FIG. 1) may also complete the pressing of the separator 13.

In this state, the cutting member 141 (in FIG. 1) illustrated in FIG. 1 may move down in the direction of the separator 13 (in FIG. 1) and may cut the separator 13 (in FIG. 1), and when the cutting of the separator 13 (in FIG. 1) is completed, the electrode assembly may remain in the release gripper 122. The electrode assembly completed as above may be supplied to a subsequent process requiring the electrode assembly by the release gripper 122 or another transfer apparatus (not illustrated).

According to the example embodiment as described above, the release gripper 122 may provide an appropriate tension to the separator 13 while the preliminary electrode assembly 10 is drawn out from the stacking plate 110. Also, while an appropriate tension is provided to the separator 13, the cutting member 141 (in FIG. 1) may start moving such that the separator 13 may be swiftly cut, which may contribute to improving productivity of the electrode assembly, and may contribute to implementing continuity of the process of manufacturing the electrode assembly.

Figure 5:
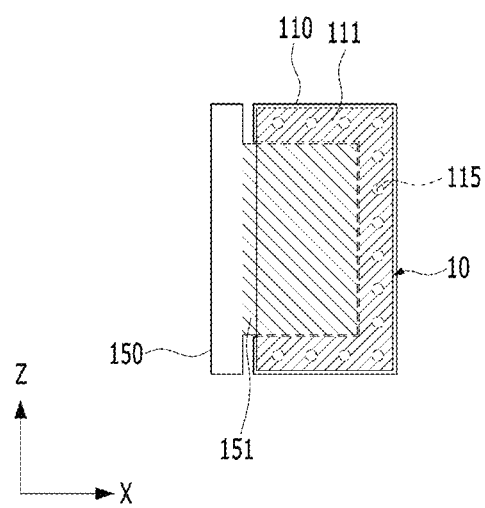
FIG. 5 is a plan diagram illustrating a portion of an apparatus for manufacturing an electrode assembly according to another example embodiment of the present disclosure.

FIG. 5 is a plan diagram illustrating a portion of an apparatus for manufacturing an electrode assembly according to another example embodiment.

As illustrated in FIG. 5, the apparatus for manufacturing an electrode assembly according to another example embodiment may include a moving plate 150 supporting the preliminary electrode assembly 10 together with the stacking plate 110.

The moving plate 150 may include a second stacking region 151 in which at least a portion of the region thereof is surrounded by the stacking plate 110. The second stacking region 151 may support a cathode plate 11 (in FIG. 2), an anode plate 12 (in FIG. 2), and a separator 13 (in FIG. 2) together with the first stacking region 111. Using the moving plate 150, the load of the preliminary electrode assembly 10 may be more easily supported.

Figure 6:
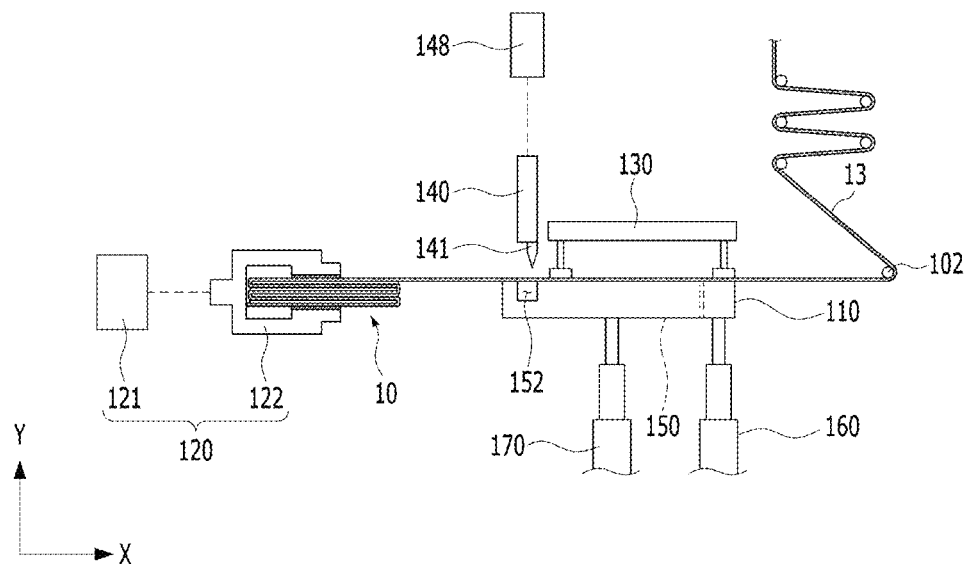
FIG. 6 is a diagram illustrating a portion of an apparatus for manufacturing an electrode assembly according to another example embodiment of the present disclosure.

FIG. 6 is a diagram illustrating a portion of an apparatus for manufacturing an electrode assembly according to another example embodiment.

As illustrated in FIG. 6, the second actuator 170 may be connected to the moving plate 150 in another example embodiment. The second actuator 170 may move the moving plate 150 in the +Y direction and the −Y direction. The second actuator 170 may include a robotic arm, a cylinder using hydraulic pressure or pneumatic pressure, a ball screw connected to the rotation shaft of the motor, and a transfer nut converting a rotational movement of the ball screw into a linear movement, but an example embodiment thereof is not limited thereto, and this configuration may be appropriately selected and applied in consideration of the manufacturing environment.

In an example embodiment, the moving plate 150 may include a second escape groove 152. The second escape groove 152 may be a groove formed in the −Y direction on an outer periphery of the moving plate 150. At least a partial region of the cutting member 141 in which the separator 13 has been cut may be inserted into the second escape groove 152.

Figure 7:
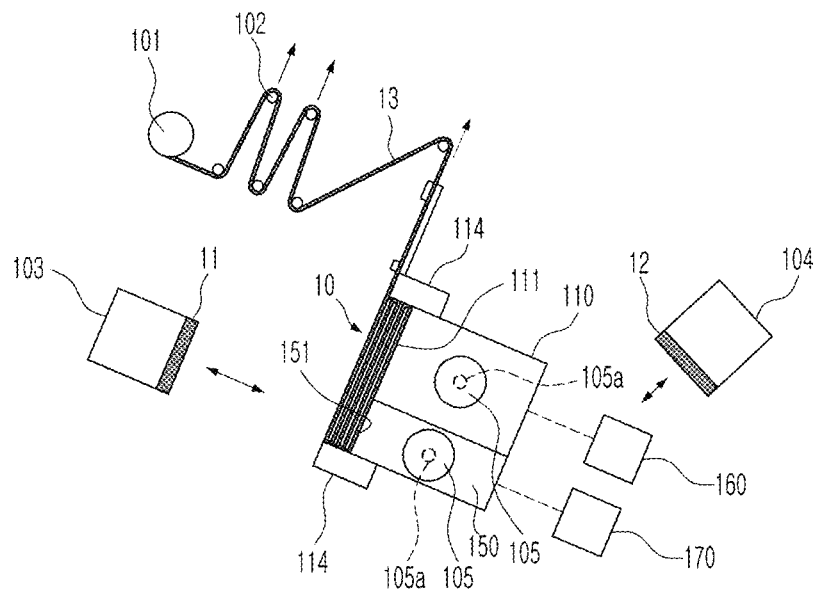
FIG. 7 is a diagram schematically illustrating a process in which an apparatus for manufacturing an electrode assembly stacks a preliminary electrode assembly according to another example embodiment of the present disclosure.

FIG. 7 is a diagram schematically illustrating a process in which an apparatus for manufacturing an electrode assembly stacks a preliminary electrode assembly 10 according to another example embodiment.

As illustrated in FIG. 7, in the apparatus for manufacturing an electrode assembly according to an example embodiment, the separator 13, the cathode plate 11, and the anode plate 12 may be stacked on the first stacking region 111 of the stacking plate 110 and the second stacking region 151 of the moving plate 150. The method of stacking the separator 13, the cathode plate 11, and the anode plate 12 on the first stacking region 111 and the second stacking region 151 may be the same as the method of stacking the separator 13, the cathode plate 11, and the anode plate 12 on the first stacking region 111 described with reference to FIG. 2. To this end, the rotation actuator 105 may also be connected to the moving plate 150. The rotation actuator 105 connected to the moving plate 150 may rotate the moving plate 150 in the same manner as the stacking plate 110.

The second actuator 170 connected to the moving plate 150 may move the moving plate down 150 in the same manner as the first actuator 160 while the separator 13, the cathode plate 11 and the anode plate 12 are stacked in the second stacking region 151. The second actuator 170 may move the moving plate down 150 such that the second stacking region 151 may be disposed on the same level as a level of the first stacking region 111, while the separator 13, the cathode plate 11 and the anode plate 12 are stacked.

In another example embodiment, the first actuator 160 may be connected to the moving plate 150 as well. The first actuator 160 may move down the stacking plate 110 and the moving plate 150 simultaneously while the separator 13, the cathode plate 11 and the anode plate 12 are stacked in the first stacking region 111 and the second stacking region 151.

The second actuator 170 may move the moving plate up 150 to an initial position when the operation of stacking the separator 13, the cathode plate 11 and the anode plate 12 in the second stacking region 151 is completed. The initial position of the moving plate 150 may be the same as the initial position of the stacking plate 110.

Figure 8:
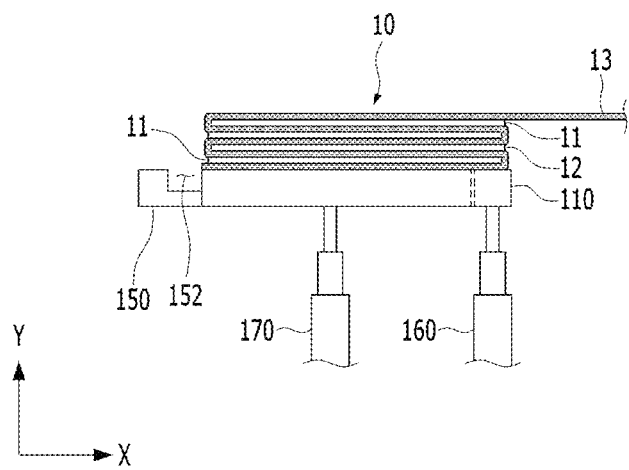
FIG. 8 is a diagram illustrating a stacking plate and a moving plate according to an example embodiment of the present disclosure, viewed from the front.

FIG. 8 is a diagram illustrating a stacking plate 110 and a moving plate 150 according to an example embodiment, viewed from the front.

As illustrated in FIG. 8, the stacking plate 110 and the moving plate 150 may support the preliminary electrode assembly 10 on the same level in the Y-axis direction. In this case, the second escape groove 152 of the moving plate 150 may be formed in the moving plate 150 to be present outside the preliminary electrode assembly 10. The separator 13 may be continuously supplied to the stacking plate 110 and the moving plate 150 while the separator 13, the anode plate 12 and the cathode plate 11 are stacked on the stacking plate 110 and the moving plate 150.

Figure 9:
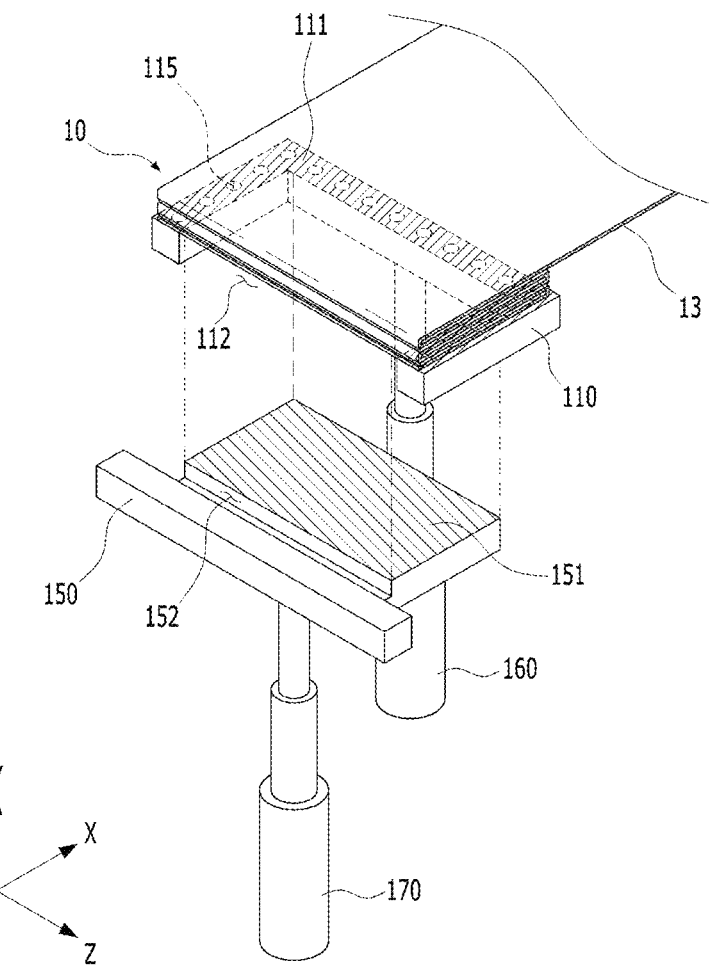
FIG. 9 is a diagram illustrating an operation state of a stacking plate and a moving plate according to an example embodiment of the present disclosure.

FIG. 9 is a diagram illustrating an operation state of a stacking plate 110 and a moving plate 150 according to an example embodiment.

As illustrated in FIG. 9, when a predetermined number of cathode plates 11 (in FIG. 8) and anode plates 12 (in FIG. 8) are stacked in the first stacking region 111 and the second stacking region 151, additional supply of the separator 13 may be stopped. Thereafter, the second actuator 170 may move the moving plate 150 down in the −Y direction, and the region of the moving plate 150 inserted into the hollow portion 112 of the stacking plate 110 may be separated from the hollow portion 112. Accordingly, a partial region of the preliminary electrode assembly 10 may be supported by the first stacking region 111, and the remaining region of the preliminary electrode assembly 10 may be released from the second stacking region 151. In this state, the stacking suction hole 115 may continue to perform the operation of adsorbing the preliminary electrode assembly 10. Accordingly, the preliminary electrode assembly 10 may not be separated from the first stacking region 111 and may be easily supported by the stacking plate 110.

Figure 10:
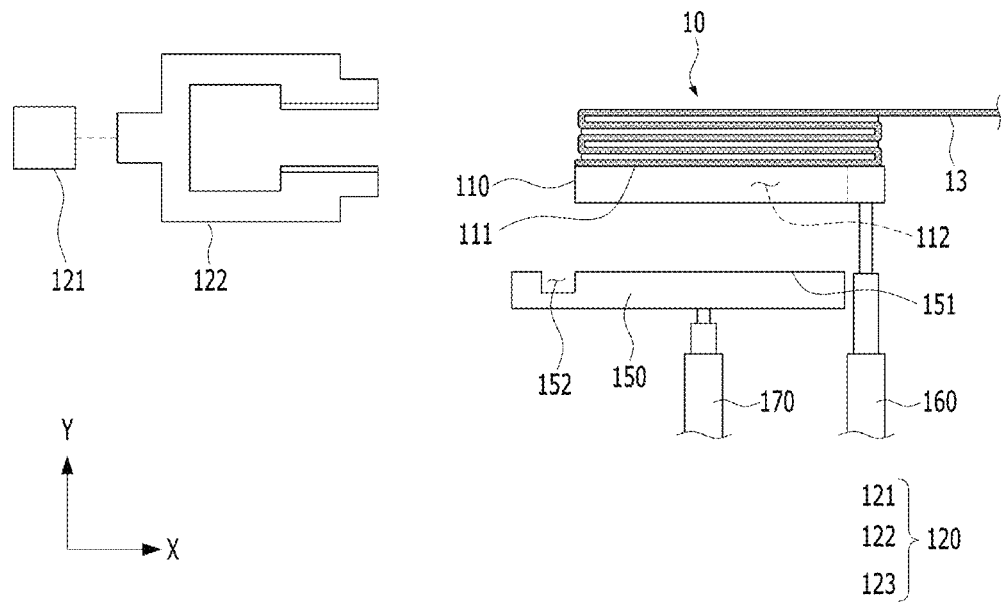
FIG. 10 is a diagram illustrating an operation state of a stacking plate, a moving plate and a release gripper according to an example embodiment of the present disclosure.

FIG. 10 is a diagram illustrating an operation state of a stacking plate 110, a moving plate 150 and a release gripper 122 according to an example embodiment.

As illustrated in FIG. 10, while the moving plate 150 is separated from the hollow portion 112 of the stacking plate 110, and the hollow portion 112 of the stacking plate 110 is exposed, the release actuator 121 may move the release gripper 122 such that the release gripper 122 is disposed to oppose the preliminary electrode assembly 10.

Figure 11:
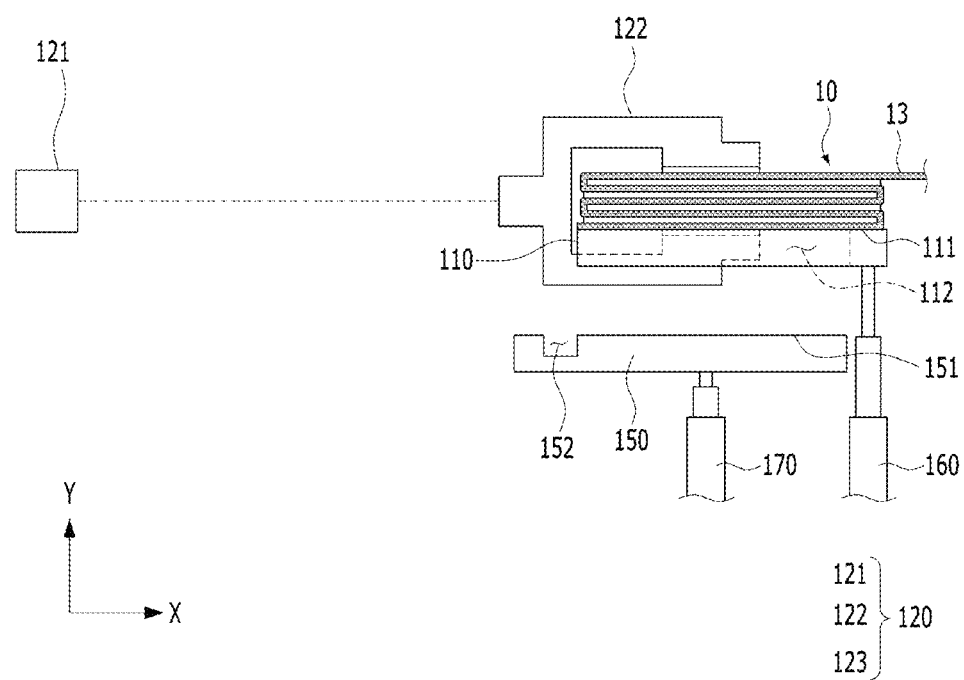
FIG. 11 is a diagram illustrating an operation state of a stacking plate, a moving plate and a release gripper according to an example embodiment of the present disclosure.

FIG. 11 is a diagram illustrating an operation state of a stacking plate 110, a moving plate 150 and a release gripper 122 according to an example embodiment.

As illustrated in FIG. 11, the release actuator 121 may move the release gripper 122 such that the release gripper 122 may enter the hollow portion 112.

Figure 12:
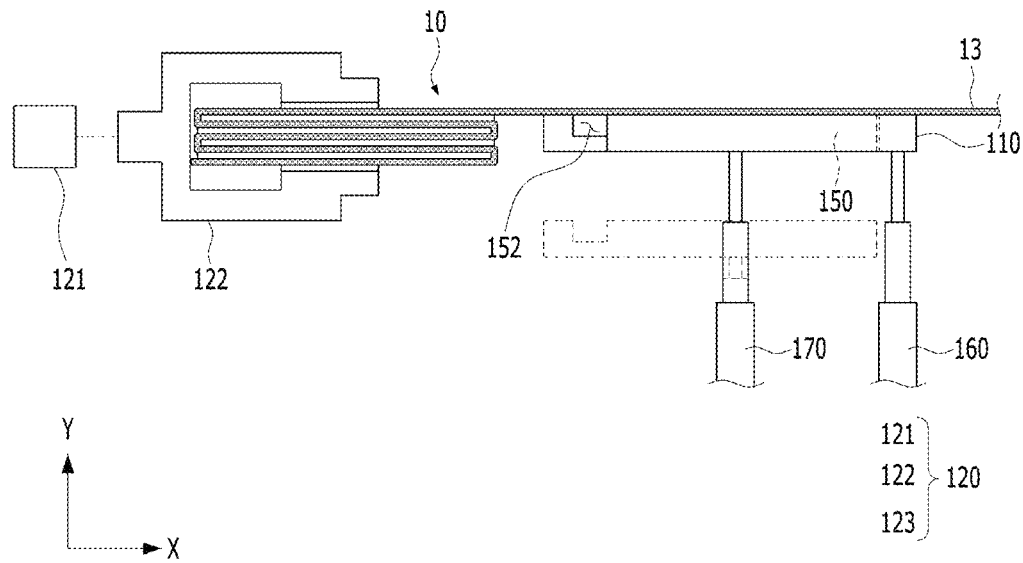
FIG. 12 is a diagram illustrating an operation state of a stacking plate, a moving plate and a release gripper according to an example embodiment of the present disclosure.

FIG. 12 is a diagram illustrating an operation state of a stacking plate 110, a moving plate 150 and a release gripper 122 according to an example embodiment.

As illustrated in FIG. 12, the release actuator 121 may move the release gripper 122 in the −X direction and may withdraw the release gripper 122 to the outside of the hollow portion 112. Accordingly, the preliminary electrode assembly 10 gripped by the release gripper 122 may also be drawn out of the hollow portion 112, and as separator 13 is stretched, the only the separator 13 may oppose the second escape groove 152.

While the release gripper 122 moves in the −X direction or after the release gripper 122 finishes moving in the −X direction, the first actuator 160 may move the stacking plate up 110 in the +Y direction and may allow the stacking plate 110 to return to an initial position.

While the first actuator 160 moves up the stacking plate 110 in the +Y direction, the second actuator 170 may move the moving plate 150 up in the +Y direction and may allow the moving plate 150 to return to an initial position. Accordingly, the first stacking region 111 (in FIG. 11) of the stacking plate 110 and the second stacking region 151 (in FIG. 11) of the moving plate 150 may be disposed on the same level in the Y-axis.

In this state, the separator 13 present on the uppermost portion of the preliminary electrode assembly 10 gripped by the release gripper 122 and the separator 13 covering the second escape groove 152 may also be aligned in the X-axis direction.

Figure 13:
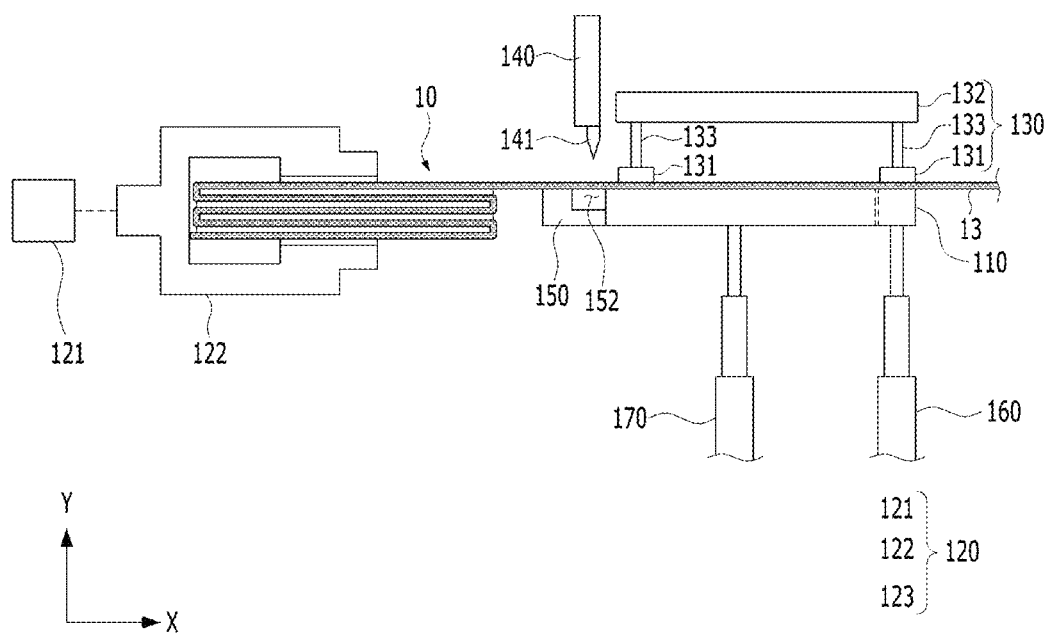
FIG. 13 is a diagram illustrating a portion of an apparatus for manufacturing an electrode assembly according to another example embodiment of the present disclosure.

FIG. 13 is a diagram illustrating a portion of an apparatus for manufacturing an electrode assembly according to another example embodiment.

As illustrated in FIG. 13, in a state in which the preliminary electrode assembly 10 is gripped by the release gripper 122 and is drawn out of the stacking plate 110, and only the separator 13 oppose the second escape groove 152, the separator fixing unit 130 may move down in the −Y direction and may press the separator 13. The separator fixing unit 130 may be disposed to oppose the first stacking region 111 (in FIG. 11) with the separator 13 interposed therebetween.

The separator fixing unit 130 may provide tension to the separator 13 in a position opposite to the release gripper 122 in the X-axis direction. Accordingly, tension may be provided by the release gripper 122 to the separator 13 present in the −X direction of the cutting member 141 with respect to the cutting member 141, and tension may be provided by the separator fixing unit 130 to the separator 13 present in the +X direction of the cutting member 141. When the separator is cut by providing tension to the separator from both sides of the cutting member 141 as above, tearing of the separator may be prevented, and deterioration of quality of cutting the separator may be prevented.

In an example embodiment, the separator fixing unit 130 may include a fixing member 131 in contact with the separator 13, a driving rod 133 connected to the fixing member 131, and a close-contact actuator 132 connected to the driving rod 133 and moving the driving rod 133 in the +Y direction and the −Y direction. The close-contact actuator 132 may include a robotic arm, a cylinder using hydraulic pressure or pneumatic pressure, a ball screw connected to a rotation shaft of a motor, and a transfer nut converting rotational movement of the ball screw into linear movement, but an example embodiment thereof is not limited thereto, and this configuration may be appropriately selected and applied in consideration of the manufacturing environment.

The close-contact actuator 132 may move the fixing member 131 in the direction of the separator 13 such that the fixing member 131 may press the separator 13, and the close-contact actuator 132 may move the fixing member 131 by pressing force of the fixing member 131 within a range in which the surface of the separator 13 is not damaged.

When the fixing member 131 is in contact with the separator 13, the cutting member 141 may move down in the −Y direction and may cut the separator 13, and at least a partial region of the cutting member 141 may be inserted into the second escape groove 152. Thereafter, the release gripper 122 may post-process the completed electrode assembly, and the operation of stacking the cathode plate 11 (in FIG. 8), the anode plate 12 (in FIG. 8) and the separator 13 on the stacking plate 110 and the moving plate 150 may be performed.

Figure 14:
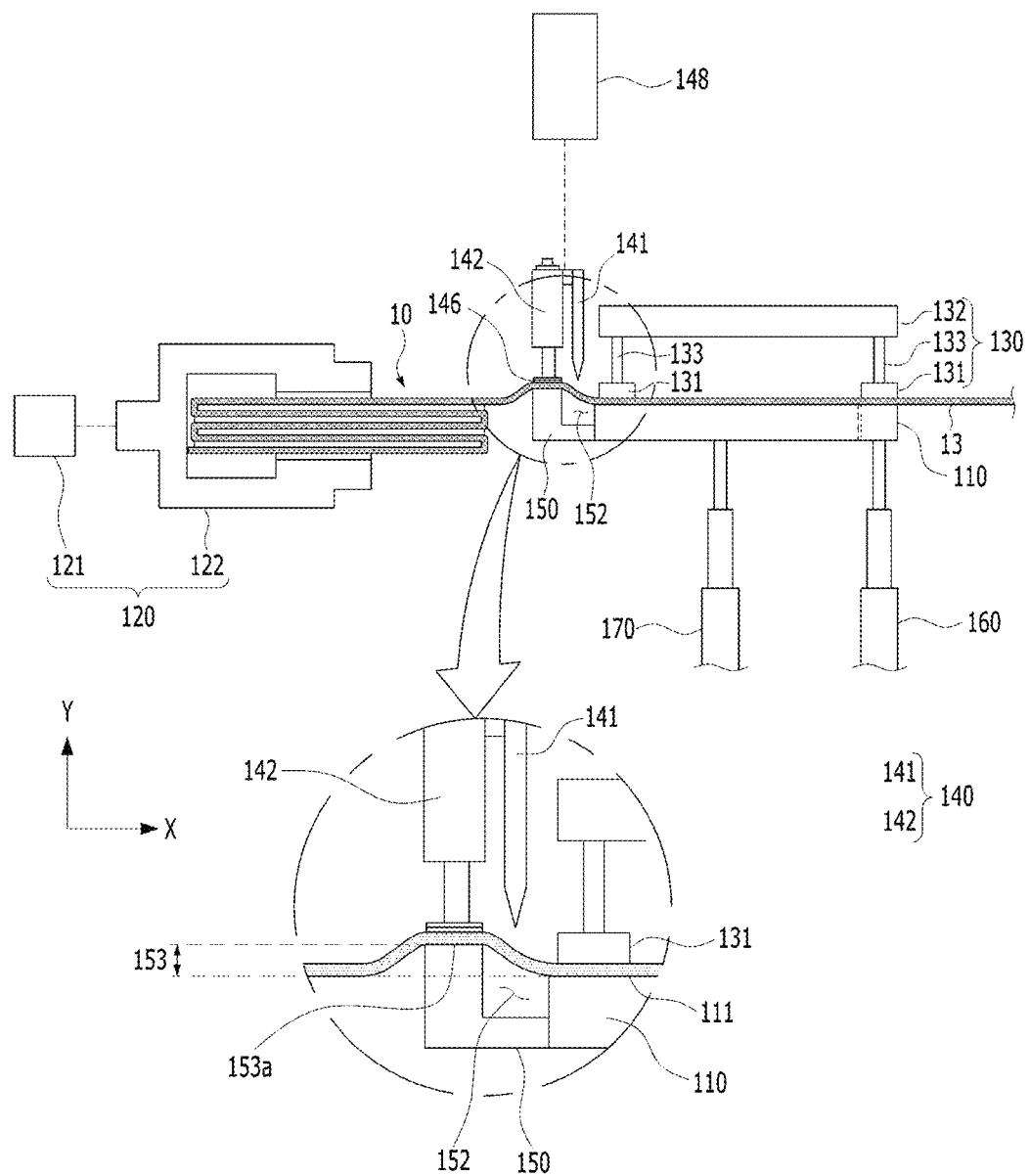
FIG. 14 is a diagram illustrating a portion of an apparatus for manufacturing an electrode assembly according to another example embodiment of the present disclosure.

FIG. 14 is a diagram illustrating a portion of an apparatus for manufacturing an electrode assembly according to another example embodiment.

As illustrated in FIG. 14, in an example embodiment, the moving plate 150 may include a protrusion region 153 formed as a region adjacent to the second escape groove 152 in the —X direction protrudes by a predetermined length in the +Y. The end 153a of the protrusion region 153 may press the separator 13 in the +Y direction from the lower portion of the separator 13 and may push the separator up 13 in the +Y direction, and accordingly, the separator 13 may be disposed to be inclined with respect to the X-axis. When the region adjacent to the second escape groove 152 in the moving plate 150 is provided as the protrusion region 153, tension may be provided to the separator 13 in the region most adjacent to the cutting member 141.

The height of the end 153a of the protrusion region 153 in the Y-axis direction may be greater than the height of the stacking plate 110 in the Y-axis direction, and the height of the other end (not illustrated) in the Y-axis direction may be the same as the height of the stacking plate 110 in the Y-axis direction. In an example embodiment, the length of the protrusion region 153 in the Y-axis direction may be 1 mm or more and 5 mm or less. Accordingly, an appropriate level of tension may be provided to the separator 13 while preventing the separator 13 from being deformed or breaking before being cut.

In an example embodiment, the end 153a of the protrusion region 153 may be disposed closer to the Y axis than the cutting member 141. Accordingly, the cutting member 141 may cut the separator 13 in an inclined state with respect to the X-axis. When the separator 13 is inclined with respect to the X-axis, tension may be provided to the separator 13 with a relatively small force as compared to the separator 13 in a state parallel to the X-axis.

Also, when providing tension of the same strength to the separator 13 inclined with respect to the X-axis and the separator 13 parallel to the X-axis, to provide tension to the separator 13 parallel to the X-axis, the release gripper 122 may move by a first distance (not illustrated) in the −X direction.

Differently from the above example, to provide tension to the separator 13 inclined to the X-axis, the release gripper 122 may move in the −X direction by a second distance (not illustrated), and the second distance (not illustrated) may be shorter than the first distance (not illustrated). Accordingly, an appropriate tension may be provided to the separator 13 while configuring the moving distance of the release gripper 122 to be relatively short, which may contribute to improvement of space efficiency, and may contribute to improvement of operation efficiency of the manufacturing apparatus.

Also, since the separator cutting unit 140 for cutting the separator 13 is disposed adjacent to the stacking plate 110 and the moving plate 150, immediately after cutting the separator 13, the operation of stacking the preliminary electrode assembly 10 may be performed immediately. Also, since the protrusion region 153 and the separator cutting unit 140 are configured to not interfere with the release gripper 122, these configurations may also contribute to improvement of space efficiency and improvement of operation efficiency of the manufacturing apparatus.

Figure 15:
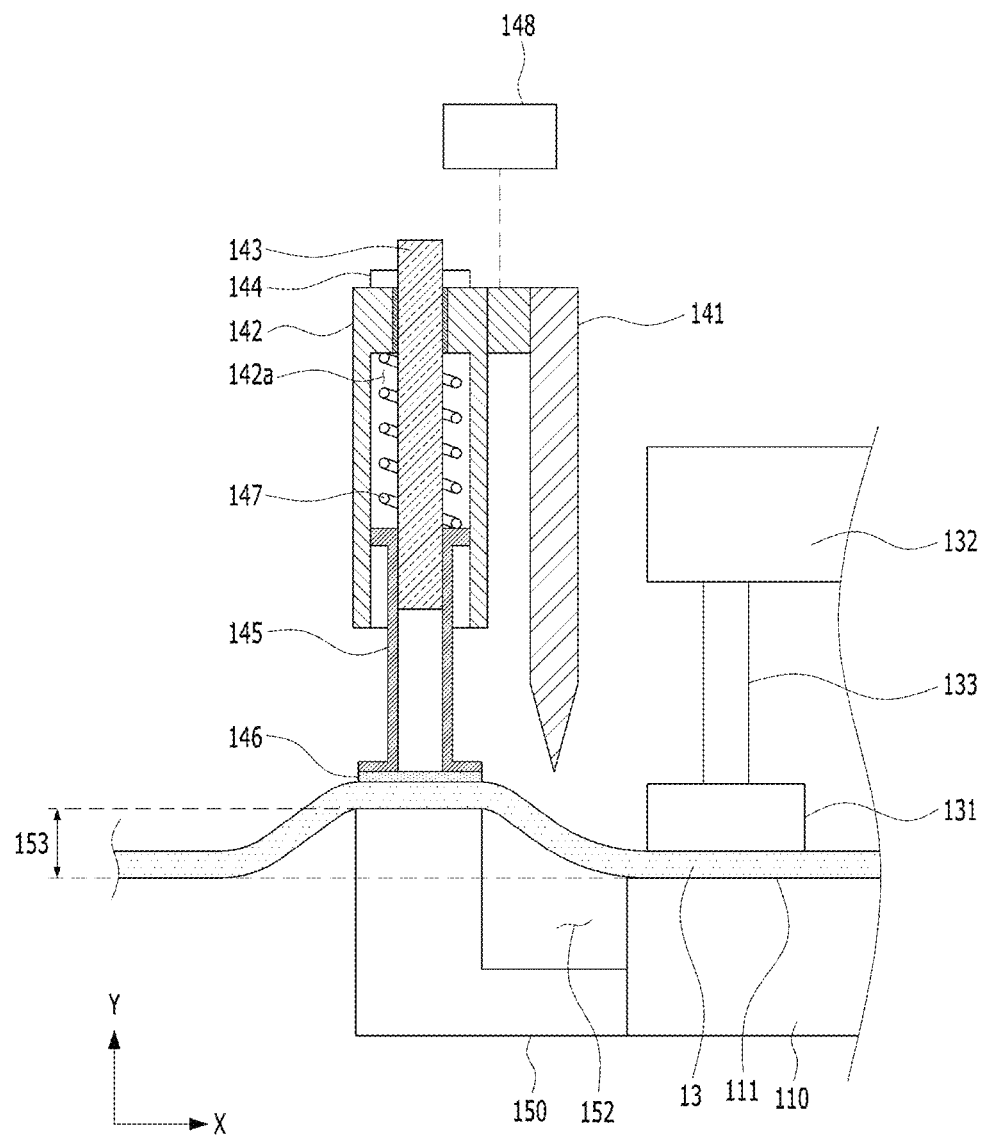
FIG. 15 is a cross-sectional diagram illustrating a portion of a separator cutting unit according to an example embodiment of the present disclosure.

FIG. 15 is a cross-sectional diagram illustrating a portion of a separator cutting unit 140 (in FIG. 14) according to an example embodiment.

As illustrated in FIG. 15, the separator cutting unit 140 (in FIG. 14) according to an example embodiment may include a cutting member 141 for cutting the separator 13 and a cutting housing 142 to which the cutting member 141 is fixed. A cutting actuator 148 may be connected to the cutting housing 142, and the cutting actuator 148 may move the cutting housing 142 in the −Y direction and the +Y direction to allow the pad 146 to be in contact with the separator 13 or to be released from the separator 13. The cutting actuator 148 may move the cutting housing 142 down in the −Y direction while the separator 13 is pressed by the protrusion region 153 and the fixing member 131 such that the pad 146 may press the separator.

In an example embodiment, the cutting actuator 148 may include a robotic arm, a cylinder using hydraulic or pneumatic pressure, a ball screw connected to a rotation shaft of a motor, and a transfer nut converting rotational movement of the ball screw into a linear movement, but an example embodiment thereof is not limited thereto, and this configuration may be appropriately selected and applied in consideration of the manufacturing environment.

The cutting housing 142 may include an accommodating space 142a therein, and a guide bush 143 may be provided in the accommodating space 142a. The guide bush 143 may penetrate through the cutting housing 142 from the outside of the cutting housing 142 such that at least a partial region thereof may be disposed in the accommodation space 142a. A bearing may be provided in a contact region between an outer periphery of the guide bush 143 and the cutting housing 142 and may reduce friction between the guide bush 143 and the cutting housing 142.

An engaging member 144 may be mounted on the outer surface of the cutting housing 142 and the outer periphery of the guide bush 143. The engaging member 144 may be fitted and coupled to the outer periphery of the guide bush 143, and the outer periphery may be provided to be larger than the outer periphery of the guide bush 143. The outer surface of the engaging member 144 may be in contact with the cutting housing 142 such that the guide bush 143 may be prevented from being separated to the outside of the cutting housing 142.

The driving shaft 145 may be connected to the guide bush 143 in the Y-axis direction. The driving shaft 145 may be fixed to the guide bush 143 by a coupling member such as a bolt (not illustrated) or an adhesive.

A pad 146 may be provided on an end of the driving shaft 145 in the −Y direction. The pad 146 may oppose the protrusion region 153 with the separator 13 interposed therebetween, and may press the separator 13. The pad 146 may be formed of a material which may not damage the surface of the separator 13. At least a partial region of the pad 146 may be aligned with at least a partial region of the protrusion region 153 in the Y-axis direction. Accordingly, the separator 13 may be effectively pressed.

The receiving space 142a of the cutting housing 142 may include an elastic member 147 of which a length may be reduced by being pressed by the driving shaft 145 and the cutting housing 142. The elastic member 147 may be pressed by the driving shaft 145 and the cutting housing 142 while the cutting actuator 148 moves the cutting housing 142 in the −Y direction, such that the length in the Y-axis direction may be reduced. The elastic member 147 may work as a buffer when the cutting housing 142 moves down by the cutting actuator 148 and the pad 146 is in contact with the separator 13.

Figure 16:
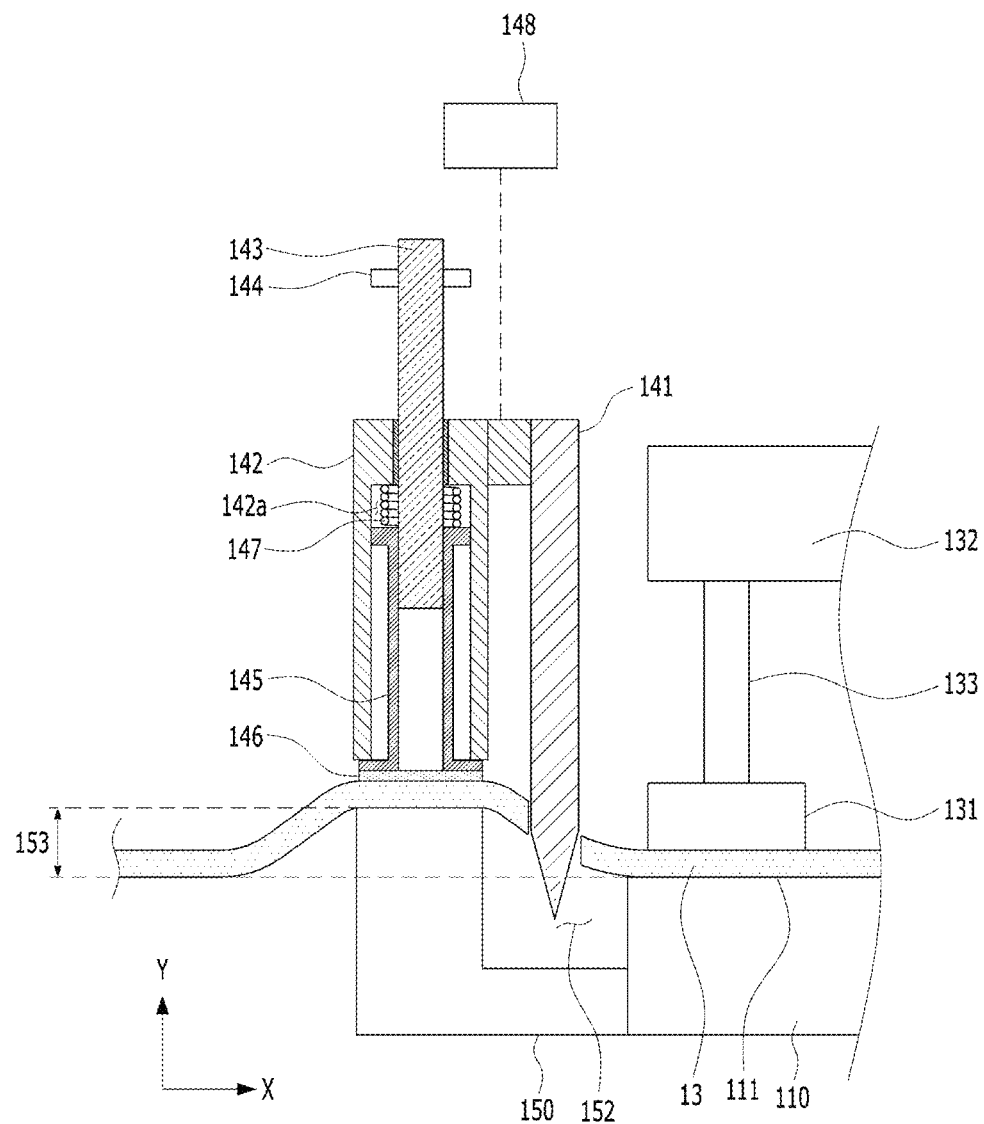
FIG. 16 is a cross-sectional diagram illustrating a portion of a separator cutting unit according to an example embodiment of the present disclosure, illustrating a state in which a cutting housing moves down.

FIG. 16 is a cross-sectional diagram illustrating a portion of a separator cutting unit 140 (in FIG. 14) according to an example embodiment, illustrating a state in which a cutting housing 142 moves down.

As illustrated in FIG. 16, the cutting actuator 148 move down the cutting housing 142 in the —Y direction while the separator 13 is pressed by the protrusion region 153, the fixing member 131 and the pad 146, such that the cutting member 141 may cut the separator 13.

At least a portion of the cutting member 141 having finished cutting the separator 13 may be inserted into the second escape groove 152. In this case, the locking member 144 may be released from the cutting housing 142 and may move up in the +Y direction, and a level of the elastic member 147 may be reduced in the Y-axis direction and the elastic member 147 may perform a cushioning function.

In an example embodiment, the separator 13 cut by the cutting member 141 may also be fixed with a separate separator clamper (not illustrated). When the cut separator 13 is fixed with a separator clamper (not illustrated), the operation in which the separator 13 wraps around the preliminary electrode assembly (10 in FIG. 14) may be more easily performed. In an example embodiment, the separator clamper (not illustrated) may fix the separator 13 by a vacuum adsorption method.

Using the apparatus for manufacturing an electrode assembly in the example embodiment described above, the operation of stacking the cathode plate 11 (in FIG. 2), the anode plate 12 (in FIG. 2) and the separator 13 (in FIG. 2) may be swiftly performed. Also, once the operation of stacking the separator 13 is completed, the preliminary electrode assembly 10 may be drawn out from the stacking plate 110 (in FIG. 2) and tension may be provided to the separator 13. Accordingly, the operation of cutting the separator 13 may also be performed immediately on the stacking plate 110 (in FIG. 2) on which the operation of stacking the separator 13 has been performed. According to the example embodiment as described above, efficiency and speed of the process of manufacturing the electrode assembly may improve, and continuity of the manufacturing process may be assured. Also, quality of cutting the separator 13 may improve, and quality of the electrode assembly may improve.

Figure 17:
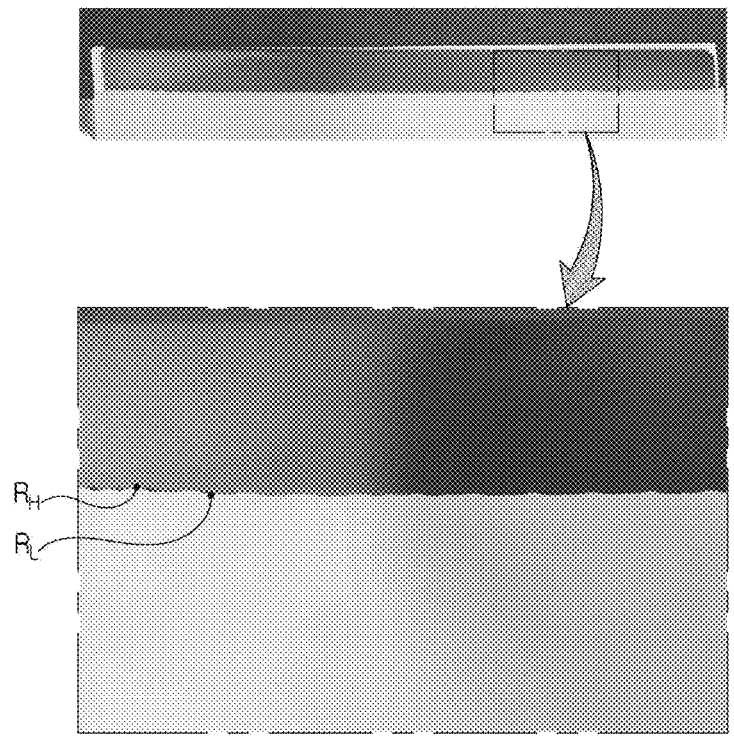
FIG. 17 is an image of a cut-out surface of a separator cut by an apparatus for manufacturing an electrode assembly according to an example embodiment of the present disclosure.

As another aspect, the example embodiment provides an electrode assembly formed by cutting the separator by the above apparatus for manufacturing an electrode assembly. FIG. 17 is an image of a cut-out surface of a separator cut by an electrode assembly manufacturing device. The cut surface of the separator may be formed in the width direction of the separator.

The separator cut by the apparatus for manufacturing an electrode assembly according to an example embodiment may include a plurality of uneven regions in the cut-out surface thereof. Since the apparatus for manufacturing an electrode assembly according to an example embodiment provides sufficient tension to the separator, the separator may be but while preventing tearing of the separator. The quality of the cut-out surface of the separator cut by the apparatus for manufacturing an electrode assembly according to an example embodiment may be relatively high.

Among the plurality of uneven regions present on the cut surface of the separator cut by the apparatus for manufacturing an electrode assembly according to an example embodiment, the difference in height between the point having a maximum height RH and the point having the lowest height $R_L$ may be 0 mm or more and 2 mm or less.

Figure 18:
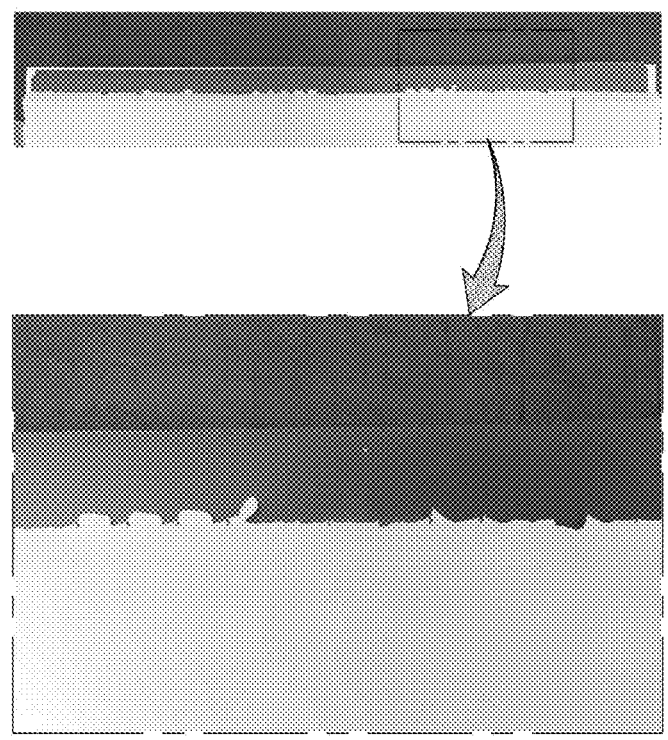
FIG. 18 is an image of a cut-out surface of a separator cut by a general cutting member.

FIG. 18 is an image of a cut-out surface of a separator cut by a cutting member. It is indicated that a difference in height between the uneven regions of the cut-out surface of the separator illustrated in FIG. 18 may be large as compared to the cut-out surface of the separator illustrated in FIG. 17, and the quality of the cut-out surface may be low. Such a separator may deteriorate the quality of the electrode assembly, and may eventually improve a defect rate of the electrode assembly and may lower mass productivity of the electrode assembly.

According to the aforementioned example embodiments, quality of the electrode assembly may improve, and efficiency of the electrode assembly manufacturing process may improve.

Also, quality of the cut-out surface of the separator may improve.

While the example embodiments have been illustrated and described above, it will be apparent to those skilled in the art that modifications and variations could be made without departing from the scope of the present disclosure as defined by the appended claims.

What is claimed is:

1. An apparatus for manufacturing an electrode assembly, the apparatus comprising:
   a stacking plate including a first stacking region to support a cathode plate, an anode plate, and a separator to be stacked on the first stacking region;
   a first actuator connected to the stacking plate and configured to move the stacking plate;
   an electrode assembly release unit configured to, in a state in which a separator is present on an uppermost portion of a preliminary electrode assembly formed by stacking the cathode plate, the anode plate, and the separator, provide tension to the separator by pulling the preliminary electrode assembly to an outside of the stacking plate;
   a separator fixing unit configured to press the separator in a state in which only the separator remains on the stacking plate; and
   a separator cutting unit configured to cut the separator on the stacking plate after the separator fixing unit presses the separator,
   wherein the stacking plate includes:
   a hollow portion; and
   a first escape groove present outside the first stacking region,
   wherein the first actuator is configured to move the stacking plate down by a distance equal to a thickness of the separator whenever the separator is stacked in the first stacking region, to move the stacking plate down by a distance equal to a thickness of the cathode plate in a case that the cathode plate is stacked in the first stacking region, and to move the stacking plate down by a distance equal to a thickness of the anode plate in a case that the anode plate is stacked in the first stacking region, and
   wherein the electrode assembly release unit is configured to grip the preliminary electrode assembly and move the preliminary electrode to an outside of the hollow portion, such that only the separator opposes the first escape groove.

2. The apparatus of claim 1,
   wherein the first actuator is configured to, in a state in which only the separator opposes the first escape groove, move the stacking plate up and allow the stacking plate to return to an initial position, and
   wherein the separator cutting unit is configured to be inserted into the first escape groove, in a state in which the separator opposes the first escape groove cut the separator.

3. The apparatus of claim 1, further comprising:
   a moving plate having a second stacking region surrounded by the stacking plate, on which the cathode plate, the anode plate and the separator are stacked in the second stacking region; and
   a second actuator connected to the moving plate and configured to move the moving plate.

4. The apparatus of claim 3, wherein the moving plate includes a protrusion region disposed to oppose the separator cutting unit with the separator interposed therebetween and configured to push the separator up in a direction of the separator cutting unit.

5. The apparatus of claim 4,
   wherein the stacking plate includes a hollow portion into which the moving plate is inserted, and
   wherein at least a portion of the moving plate is present in the hollow portion.

6. The apparatus of claim 5,
   wherein the first actuator is configured to: move the stacking plate down by a distance equal to a thickness of the separator in a case that the separator is stacked in the first stacking region; move the stacking plate down by a distance equal to a thickness of the cathode plate in a case that the cathode plate is stacked in the first stacking region; and move the stacking plate down by a distance equal to a thickness of the anode plate in a case that the anode plate is stacked in the first stacking region, and
   wherein the second actuator is configured to move the moving plate down, such that the second stacking region is disposed on the same level as a level of the first stacking region.

7. The apparatus of claim 6,
   wherein the second actuator is configured to move the moving plate down to allow the moving plate to be removed from the hollow portion, such that the second stacking region is separated from the preliminary electrode assembly,
   wherein the electrode assembly release unit is configured to: enter the hollow portion; grip the preliminary electrode assembly; and move the preliminary electrode assembly to an outside of the hollow portion,
   wherein the first actuator is configured to move the stacking plate up and allow the stacking plate to return to an initial position, in a state in which only the separator opposes the first stacking region, and
   wherein the second actuator is configured to move the moving plate up such that the second stacking region is disposed on the same level as a level of the first stacking region.

8. An apparatus for manufacturing an electrode assembly, the apparatus comprising:
   a stacking plate including a first stacking region to support a cathode plate, an anode plate, and a separator to be stacked on the first stacking region;
   a first actuator connected to the stacking plate and configured to move the stacking plate;
   an electrode assembly release unit configured to, in a state in which a separator is present on an uppermost portion of a preliminary electrode assembly formed by stacking the cathode plate, the anode plate, and the separator, provide tension to the separator by pulling the preliminary electrode assembly to an outside of the stacking plate;
   a separator fixing unit configured to press the separator in a state in which only the separator remains on the stacking plate;
   a separator cutting unit configured to cut the separator on the stacking plate after the separator fixing unit presses the separator;
   a moving plate having a second stacking region surrounded by the stacking plate, on which the cathode plate, the anode plate and the separator are stacked in the second stacking region; and
   a second actuator connected to the moving plate and configured to move the moving plate,
   wherein the moving plate includes a protrusion region disposed to oppose the separator cutting unit with the separator interposed therebetween and configured to push the separator up in a direction of the separator cutting unit, wherein the stacking plate includes a hollow portion into which the moving plate is inserted, wherein at least a portion of the moving plate is present in the hollow portion, wherein the first actuator is configured to: move the stacking plate down by a distance equal to a thickness of the separator in a case that the separator is stacked in the first stacking region; move the stacking plate down by a distance equal to a thickness of the cathode plate in a case that the cathode plate is stacked in the first stacking region; and move the stacking plate down by a distance equal to a thickness of the anode plate in a case that the anode plate is stacked in the first stacking region, wherein the second actuator is configured to move the moving plate down, such that the second stacking region is disposed on the same level as a level of the first stacking region wherein the second actuator is configured to move the moving plate down to allow the moving plate to be removed from the hollow portion, such that the second stacking region is separated from the preliminary electrode assembly, wherein the electrode assembly release unit is configured to: enter the hollow portion; grip the preliminary electrode assembly; and move the preliminary electrode assembly to an outside of the hollow portion, wherein the first actuator is configured to move the stacking plate up and allow the stacking plate to return to an initial position, in a state in which only the separator opposes the first stacking region, wherein the second actuator is configured to move the moving plate up such that the second stacking region is disposed on the same level as a level of the first stacking region, wherein the moving plate includes a second escape groove present outside the second stacking region, and wherein the electrode assembly release unit is configured to move the preliminary electrode assembly to the outside of the hollow portion, such that only the separator opposes the second escape groove.

9. The apparatus of claim 8, wherein the separator fixing unit is configured to: oppose the first stacking region with the separator interposed therebetween, and press the separator such that the separator is in close contact with the first stacking region.

10. The apparatus of claim 9, wherein the separator cutting unit includes a cutting member configured to move down in a direction of the separator and to cut the separator, in a state in which the separator fixing unit presses the separator, and wherein the cutting member is configured to cut the separator in a state in which the separator opposes the second escape groove, and is configured to be inserted into the second escape groove.

11. The apparatus of claim 10, wherein the protrusion region is formed as a region adjacent to the second escape groove in the moving plate protrudes in a direction of the separator.

12. The apparatus of claim 11, wherein an end of the protrusion region is in contact with the separator, and a difference in heights between the end of the protrusion and the first stacking region is in a range from 1 mm to 5 mm.

13. The apparatus of claim 1, further comprising:
a separator supply unit configured to supply the separator to the first stacking region;
a cathode plate providing unit configured to allow the cathode plate to be disposed on the separator;
an anode plate providing unit configured to allow the anode plate to be disposed on the separator; and
a rotation actuator connected to the stacking plate and configured to move the stacking plate rotationally between the cathode plate providing unit and the anode plate providing unit,
wherein the stacking plate includes at least one clamping member configured to fix the cathode plate, the anode plate, and the separator in the first stacking region.

14. The apparatus of claim 3, further comprising:
a separator supply unit configured to supply the separator to the first stacking region and the second stacking region;
a cathode plate providing unit configured to allow the cathode plate to be disposed on the separator;
an anode plate providing unit configured to allow the anode plate to be disposed on the separator; and
a rotation actuator connected to the stacking plate and the moving plate, and configured to move the stacking plate and the moving plate rotationally between the cathode plate providing unit and the anode plate providing unit,
wherein at least one of the stacking plate and the moving plate includes at least one clamping member configured to fix the cathode plate, the anode plate and the separator to at least one of the first stacking region and the second stacking region.

15. The apparatus of claim 4, wherein the separator fixing unit includes:
a fixing member in contact with the separator; and
a close-contact actuator connected to the fixing member and configured to allow the fixing member to be in close contact with the separator after the protrusion region is disposed on a level higher than a level of the first stacking region.

16. The apparatus of claim 10, wherein the separator cutting unit further includes:
a cutting housing to which the cutting member is fixed;
a guide bush configured to extend by penetrating the cutting housing;
a driving shaft connected to the guide bush and configured to extend in a direction of the separator;
a pad provided on the driving shaft and opposing the protrusion region with the separator interposed therebetween; and
a cutting actuator connected to the cutting housing and configured to move the cutting housing,
wherein the cutting actuator is configured to move the cutting housing in a direction of the separator after the separator is pressed by the protrusion region and the pad.

17. The apparatus of claim 1, wherein the electrode assembly release unit includes:
a release gripper configured to grip the preliminary electrode assembly; and
a release actuator connected to the release gripper and configured to move the release gripper.

* * * * *